No. 891,475. PATENTED JUNE 23, 1908.
J. G. HEASLET.
CLUTCH.
APPLICATION FILED JULY 17, 1907.

2 SHEETS—SHEET 2.

WITNESSES
J. R. Millward.
Nettie L. Beal.

INVENTOR
James G. Heaslet
BY
ATTORNEY

UNITED STATES PATENT OFFICE.

JAMES G. HEASLET, OF DETROIT, MICHIGAN, ASSIGNOR TO THE GARFORD COMPANY, OF ELYRIA, OHIO, A CORPORATION OF OHIO.

CLUTCH.

No. 891,475.  Specification of Letters Patent.  Patented June 23, 1908.

Application filed July 17, 1907. Serial No. 384,172.

*To all whom it may concern:*

Be it known that I, JAMES G. HEASLET, a citizen of the United States, and a resident of Detroit, in the county of Wayne and State of Michigan, (whose post-office address is 820 West Warren avenue, Detroit, Michigan,) have invented certain new and useful Improvements in Clutches, of which the following is a full, clear, and exact description, whereby and skilled in the art may make and use the same.

The invention, as indicated by its title, relates to clutches, and more particularly to a special type of such devices known as "disk clutches."

The object of the invention is to provide a clutch which will firmly unite two sections of a shaft under certain conditions, but will permit absolutely free running of one of the sections with reference to the other when released.

It further provides for a slip between the rotating parts when partially released.

A further object is to provide a clutch in which the end thrust between the clutch members is self-contained within the clutch.

Figure 1:
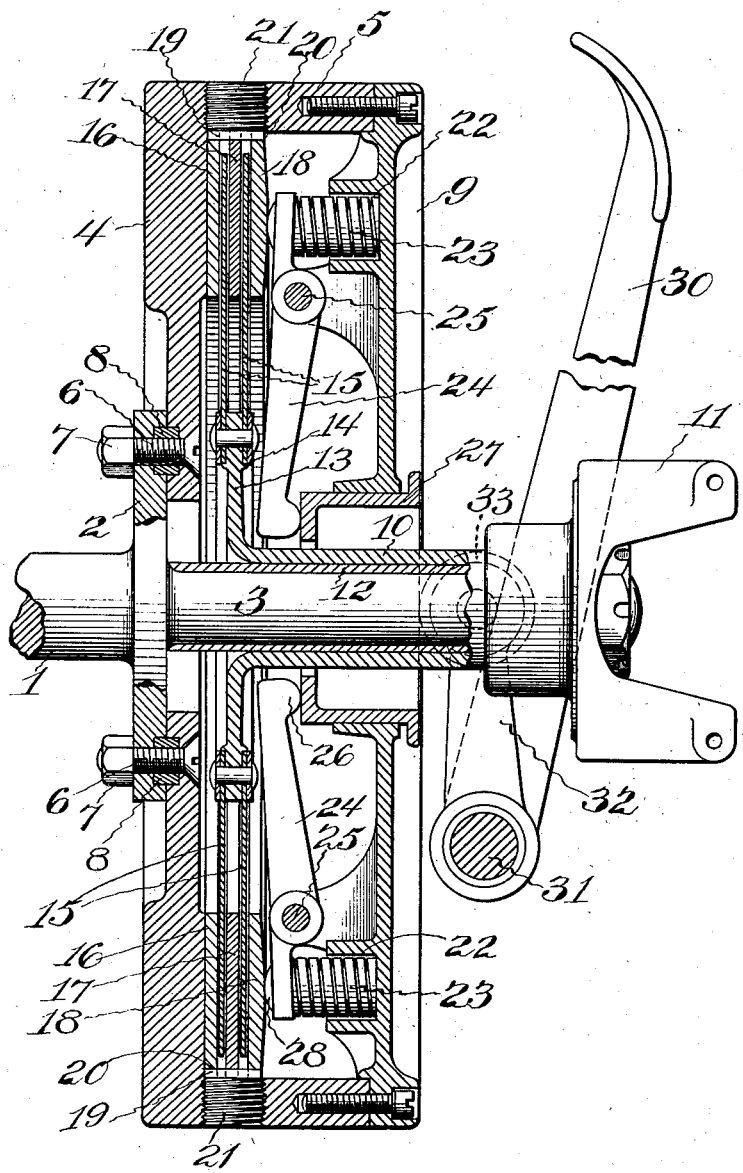
Figure 2:
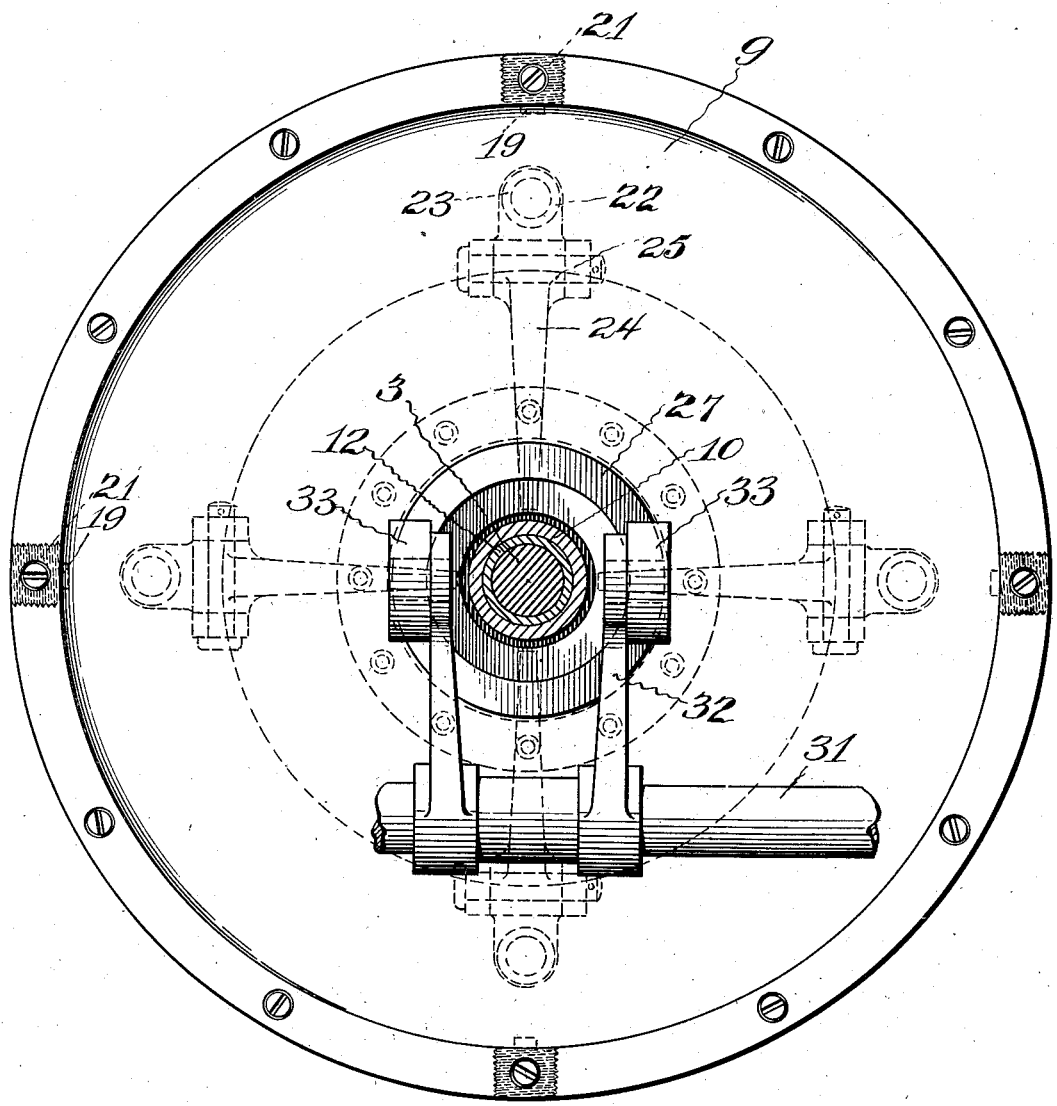

Referring to the drawings:—Figure 1 is a central sectional view through the clutch members. Fig. 2 is a rear-face view of the parts shown in Fig. 1, the yoke being broken away to better illustrate the construction.

The device as illustrated in the accompanying drawings is applied to a comparatively heavy clutch drum or fly wheel which is borne upon one end of a shaft projected within a tubular shaft section. The parts are completely inclosed and arranged to be run in a bath of oil, their disposition being such that the end thrust in the clutching and releasing movements which ordinarily in "cone clutches" exerts a considerable end thrust between the two shaft sections, is entirely eliminated.

In the accompanying drawings, numeral 1 denotes an engine shaft having a collar 2 and a reduced shaft section 3 projecting beyond the collar. Concentrically arranged with reference to the collar 2 is a fly wheel 4 of considerable weight, having a rearwardly extended flange 5. This fly wheel 4 is secured to the collar 2 through the medium of bolts 6 and nuts 7, and to obviate the shearing of the bolts 6, shearing nipples 8 are employed.
To the rear face of the flange 5 is secured a disk or plate 9 which forms a support for the clutch levers and their operating mechanism. This plate 9 serves as a cover, completely inclosing the rear face of the clutch, and preventing the escape of oil or other lubricant, as well as preventing the ingress of dirt. Extending within the receptacle thus formed, is a tubular sleeve 10 which terminates at its outer end in a universal yoke joint 11. This sleeve of course, surrounds the reduced shaft section 3, and intermediate the two there is a sleeve 12. This is preferably of bronze, and is pressed into the tubular shaft section 10.

The inner end of the tubular shaft 10 terminates in a flange 13 provided with seats 14 in which are firmly riveted steel disks 15. These disks are of nearly equal diameter with the inside diameter of the fly wheel and project between bronze rings 16—17—18, the rings 16 and 18 lying on the outside surfaces of the two steel disks, while the ring 17 is interposed between them. These rings may move axially, but are prevented from a relative rotation with reference to the fly wheel by keys 19 formed to engage keyways 20. These keys are arranged upon the end of screw threaded studs 21 which are inserted through the periphery of the fly wheel.

On the inner face of the plate 9 are formed spring cups 22 within which are arranged strong helical springs 23, which at their outer end bear against the levers 24 pivoted as at 25, to the inner side of the plate 9. These levers 24 at their opposite ends are curved as at 26 to roll upon the surface of a floating sleeve or nipple 27 and upon the end adjacent to their springs, they are rounded as at 28, to form a bearing against the clutch disk 18. It will be noted that this disk has a slight cam upon its face adjacent to the operating levers 24 in order to provide easy and free movement of the parts with reference to each other. The floating sleeve or nipple 27 is nicely fitted about the shaft section and opening of the plate or disk 9, and upon being moved axially, controls the action of the levers 24 with reference to the clutch rings and disks. The springs 22 are of such a tension that normally the bronze rings 18 are firmly pressed against the steel disks 16, and thus the two shaft sections are firmly united and they rotate in unison. To release the clutch, a pedal or lever 30 secured to a shaft 31 and bearing a yoke 32, may be pressed forward until its rolls 33 force the floating sleeve or nipple 27 inward a sufficient distance to depress the springs 22 and release the clutch rings and disks.

It will be noted that the tubular shaft 10 and nipple 27 are what might be termed floating members, and of course when the clutch rings and disks are disengaged, the friction between the rotating parts is not sufficient to move the tubular shaft section 10.

It is obvious that the details of the various parts might be varied to a considerable extent without departing from the spirit or intent of the invention, and in fact the clutching parts might be so arranged with reference to the clutch levers that it would require a depression of the lever 30 to engage the parts instead of disengaging them.

What I claim as my invention and desire to secure by Letters Patent is:—

1. In combination in a clutch, a driving member, a driven member, a series of rings having an axial movement with reference to said members, clutch disks mounted upon the driven member and projecting between the rings a plurality of resilient members for compressing the rings against the disks, and a plurality of levers coöperating with the respective resilient members.

2. In combination in a clutch, a driving member, a driven member, a series of rings having an axial movement with reference to said members, clutch disks mounted upon the driven member and projecting between the rings a plurality of resilient members for compressing the rings against the disks, a plurality of levers coöperating with the respective resilient members, and means for releasing the rings and disks.

3. In combination in a clutch, a driving member, a driven member, a series of rings carried by the driving member, a series of disks borne upon a driven member and lying between the rings of the driving member, a plurality of means for normally engaging the rings and disks, each of said means including a spring cushion and a lever, and a common means for controlling the position of said levers.

4. In combination in a clutch, a shaft, a clutch drum borne upon the shaft and provided with a rearwardly extending flange, a plate or disk secured to said flange and provided with spring cups and with springs arranged in said cups, levers pivoted to said plate and having one end extending over the spring cups and with their opposite ends resting upon a floating sleeve, and means for moving said sleeve and levers against the tension of the springs borne in said spring cups.

5. In combination in a clutch, a driving member, provided with a rearwardly extending flange, a plate or disk secured to said flange, and provided with means of attachment for a plurality of resilient compressors, said compressors arranged concentrically with reference to the center of the driving member, a plurality of levers pivoted to said plate and having one end actuated upon by the respective compressors and a floating sleeve controlling the opposite ends of said levers, and means connected with said sleeve and its levers for varying the effect of the respective compressors.

6. In combination in a clutch, a shaft, a clutch drum borne upon said shaft and provided with a rearwardly extending flange, a plurality of screw thread nipples extending through said flange and bearing guides, a plurality of plates having grooves engaging said guides for an axial movement with reference to the shaft and a driven member provided with plates coöperating with said axially movable disks, and means for compressing said disks with reference to the plates of the driven member.

7. In combination in a clutch, a driving member provided with an extended flange, a plate or disk secured to said flange, a plurality of resilient members about said disk concentrically arranged with reference to the center of the driving member, a plurality of pivoted levers, each having one end acted upon by the respective resilient members, and a common controlling means appurtenant to the opposite ends of said levers for varying the effect of the respective resilient members.

8. In combination in a clutch, a shaft, a clutch drum borne upon said shaft and provided with an extended flange, a plurality of nipples extending through said flange and bearing guides, a plurality of plates having grooves engaging said guides for an axial movement with reference to the shaft and a driven member provided with plates coöperating with said axially movable disks, and means for compressing said disks with reference to the plates of the driven member.

JAS. G. HEASLET.

Witnesses:
  L. C. STURGIS,
  D. M. FERGUSON.